US012691760B2

(12) United States Patent　　　(10) Patent No.:　US 12,691,760 B2

Ive et al.　　　　　　　　　　　　(45) Date of Patent:　　　Jul. 28, 2026

(54) ROAD VEHICLE EQUIPPED WITH INTEGRATED CONTENT DISPLAY DEVICE

(71) Applicant: FERRARI S.P.A., Modena (IT)

(72) Inventors: Jonathan P. Ive, San Francisco, CA (US); Eugene Whang, San Francisco, CA (US); Jeremy Bataillou, San Francisco, CA (US); Anthony Ashcroft, San Francisco, CA (US); Suhang Zhou, San Francisco, CA (US); Benoit Louzaouen, San Francisco, CA (US); Jemima Kiss, San Francisco, CA (US); Christopher Wilson, San Francisco, CA (US); Wan Si Wan, San Francisco, CA (US); Biotz Natera, San Francisco, CA (US); James Mcgrath, San Francisco, CA (US); Roger Guyett, San Francisco, CA (US); Joseph Luxton, San Francisco, CA (US); Michael Matas, San Francisco, CA (US); Patrick Kessler, San Francisco, CA (US); Patrizio Moruzzi, Modena (IT); Vito Conigliaro, Modena (IT)

(73) Assignee: FERRARI S.P.A., Modena (IT)

( * ) Notice: Subject to any disclaimer, the term of this patent is extended or adjusted under 35 U.S.C. 154(b) by 60 days.

(21) Appl. No.: 18/498,487

(22) Filed: Oct. 31, 2023

(65) Prior Publication Data

US 2024/0149689 A1　　May 9, 2024

(51) Int. Cl.
　　B60K 37/20　　　(2024.01)
　　B60R 11/02　　　(2006.01)
(52) U.S. Cl.
　　CPC .......... B60K 37/20 (2024.01); B60R 11/0235 (2013.01); B60K 2360/334 (2024.01);
　　　　(Continued)

(58) Field of Classification Search
　　CPC .............. B60K 37/20; B60K 2360/334; B60K 2360/66; B60K 2360/816; B60K 2360/84;
　　　　(Continued)

(56) References Cited

U.S. PATENT DOCUMENTS

|  |  |  |  |
|---|---|---|---|
| 8,576,199 B1 | 11/2013 | Pryor |  |
| 2005/0141181 A1* | 6/2005 | Stephany | .............. G06F 1/1601 |
|  |  |  | 345/905 |

(Continued)

FOREIGN PATENT DOCUMENTS

|  |  |  |  |
|---|---|---|---|
| DE | 102017217023 A1 | 3/2019 |  |
| EP | 3526070 B1 | 12/2020 |  |

(Continued)

OTHER PUBLICATIONS

Italian Search Report for Application No. 202200022701; Filing Date: Nov. 4, 2022; Date of Mailing: Jun. 5, 2023; 6 pages.

(Continued)

*Primary Examiner* — Richard T Torrente
(74) *Attorney, Agent, or Firm* — CANTOR COLBURN LLP

(57)　　　　　　　ABSTRACT

A road vehicle comprising a vehicle dashboard, comprising in turn an exposed surface visible from the interior of the passenger compartment; a content display device; a first projection device, which is configured to project onto the first projection surface one or more contents; at least one first aesthetic surface, also configured so as to substantially correspond to said part of the exposed surface; a support element, pivotably mounted on the vehicle dashboard and on which at least the first projection surface and the first aesthetic surface are arranged around an axis of symmetry; a movement system configured to rotate of the support element between a first configuration and a second configuration.

11 Claims, 6 Drawing Sheets

(52) U.S. Cl.
CPC .... *B60K 2360/66* (2024.01); *B60K 2360/816* (2024.01); *B60K 2360/84* (2024.01); *B60Y 2200/114* (2013.01); *B60Y 2400/4024* (2013.01); *B60Y 2400/92* (2013.01)

(58) Field of Classification Search
CPC ........ B60K 35/22; B60K 35/53; B60K 35/60; B60R 11/0235; B60R 2013/0287; B60R 13/0256; B60R 2011/0045; B60R 2011/0094; B60R 2011/0005; B60R 2011/0092; B60Y 2200/114; B60Y 2400/4024; B60Y 2400/92
See application file for complete search history.

(56) References Cited

U.S. PATENT DOCUMENTS

2008/0036924 A9 * 2/2008 Lester ................. B60R 11/0235
348/825

2011/0063530 A1 * 3/2011 Karsch ................ B60R 11/0235
348/837
2018/0129125 A1 * 5/2018 Chen ...................... G03B 21/10
2018/0373031 A1 12/2018 Nakayama
2021/0276419 A1 * 9/2021 Ng ........................ B60K 35/654

FOREIGN PATENT DOCUMENTS

| | | |
|---|---|---|
| EP | 3687848 B1 | 7/2022 |
| WO | 2021165138 A1 | 8/2021 |

OTHER PUBLICATIONS

Movieclips: "The Spy Who Loved Me Movie Clip= Can You Swim? (1977) HD" Sep. 25, 2012 (Sep. 25, 2012), p. 1, XP054980962; 2 pages.

* cited by examiner

FIG. 1

ROAD VEHICLE EQUIPPED WITH INTEGRATED CONTENT DISPLAY DEVICE

CROSS-REFERENCE TO RELATED APPLICATIONS

This patent application claims priority from Italian patent application no. 102022000022701 filed on Nov. 4, 2022, the entire disclosure of which is incorporated herein by reference.

TECHNICAL FIELD

The present invention concerns a road vehicle provided with an integrated content display device.

In particular, the present invention is advantageously, but not exclusively, applied in a high-performance road vehicle, to which the following description will explicitly refer without loss of generality.

BACKGROUND TO THE INVENTION

Generally, road vehicles are provided with a plurality of display devices arranged on the dashboard of the road vehicle.

Historically, each road vehicle comprises at least one display device for the driver, for example the screens or indicators arranged on the vehicle instrument panel, namely on the portion of dashboard interposed between the steering wheel and the windscreen.

In recent years, said devices can be assisted by other screens (for example at least one screen arranged centrally on the dashboard or a head-up display) which complete display of the information for the driver.

In general, the arrangement of an increasingly large central screen is becoming increasingly popular, especially in fully electric cars; however, in the majority of cases, said central screens protrude from the dashboard to which they are connected, dominating it or creating an anti-aesthetic effect, nullifying part of the work of the interior designers who define the shape and curves of the dashboard.

In fact, for technical reasons, the screens in modern cars look like independent elements, not perfectly blended in with the style of the road vehicle in which they are installed.

In general, the need is therefore felt to increase the integration of the vehicle content display systems, giving the driver and the passenger a clear view of the display without having to sacrifice the aesthetics, as happens when a rectangular screen is imposed in the centre of the dashboard.

The document DE102017217023A1 and the document EP3687848B1 describe a display device comprising a projector and a projection surface, on the rear side of which the projector projects the information display that can be recognized from the front side.

The document WO2021165138A1 describes a method for projection of the light inside a car.

The document EP3526070B1 describes a dashboard provided with an opening in which a display can be positioned. The dashboard further comprises a pivotable display mechanism.

The document U.S. Pat. No. 8,576,199B1 describes methods for the control of computers that use tactile input devices like touchscreens and touchpads.

The video clip XP054980962: "Can you swim?" taken from the film "The spy who loved me" describes a pivotable dashboard to pass from an automobile mode to an underwater mode.

The document US2018373031A1 describes a head-up display.

DESCRIPTION OF THE INVENTION

The object of the present invention is to provide a road vehicle equipped with an integrated content display device which is at least partially free from the above drawbacks and, at the same time, is easy and inexpensive to produce.

According to the present invention a road vehicle is provided equipped with an integrated content display device as claimed in the following independent claims and, preferably, in any one of the claims depending directly or indirectly on the independent claims.

The claims describe preferred embodiments of the present invention forming an integral part of the present description.

BRIEF DESCRIPTION OF THE DRAWINGS

Below, some embodiments of the invention will be described for a better understanding thereof by way of non-limiting example and with reference to the attached drawings in which:

FIG. 1 is a perspective schematic view, with details removed for clarity, of a possible embodiment of a road vehicle in accordance with the present invention;

EMBODIMENTS OF THE INVENTION

Figure 1:
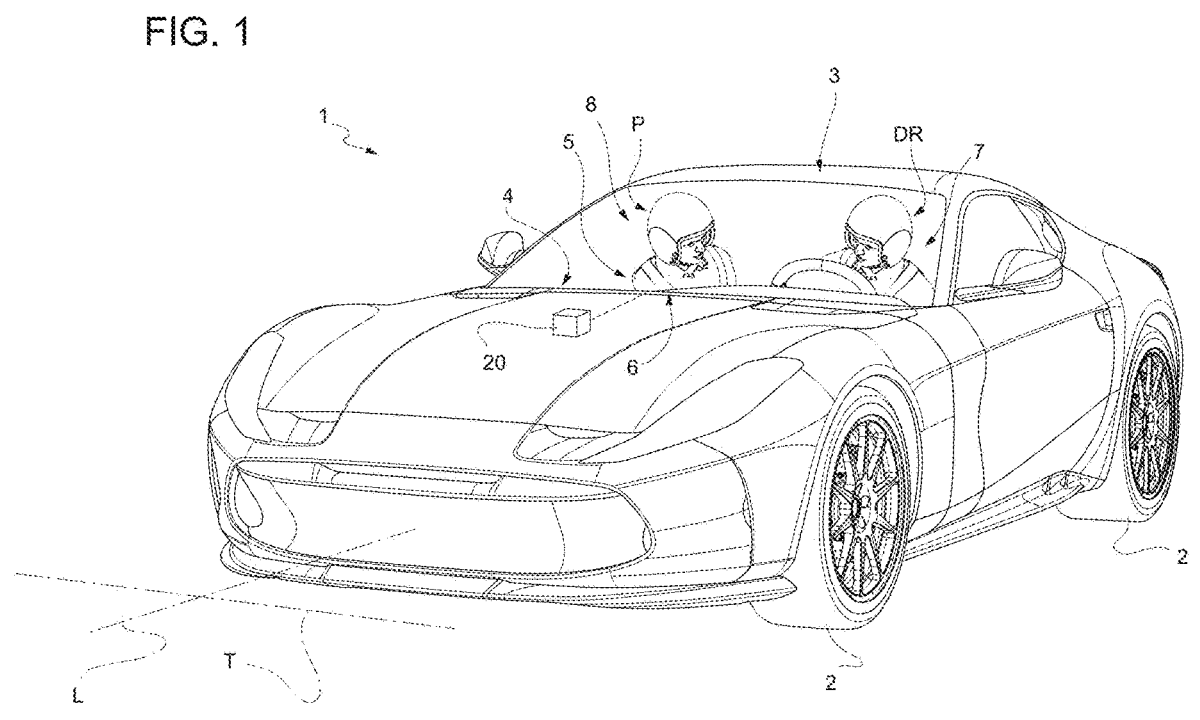
Figure 2:
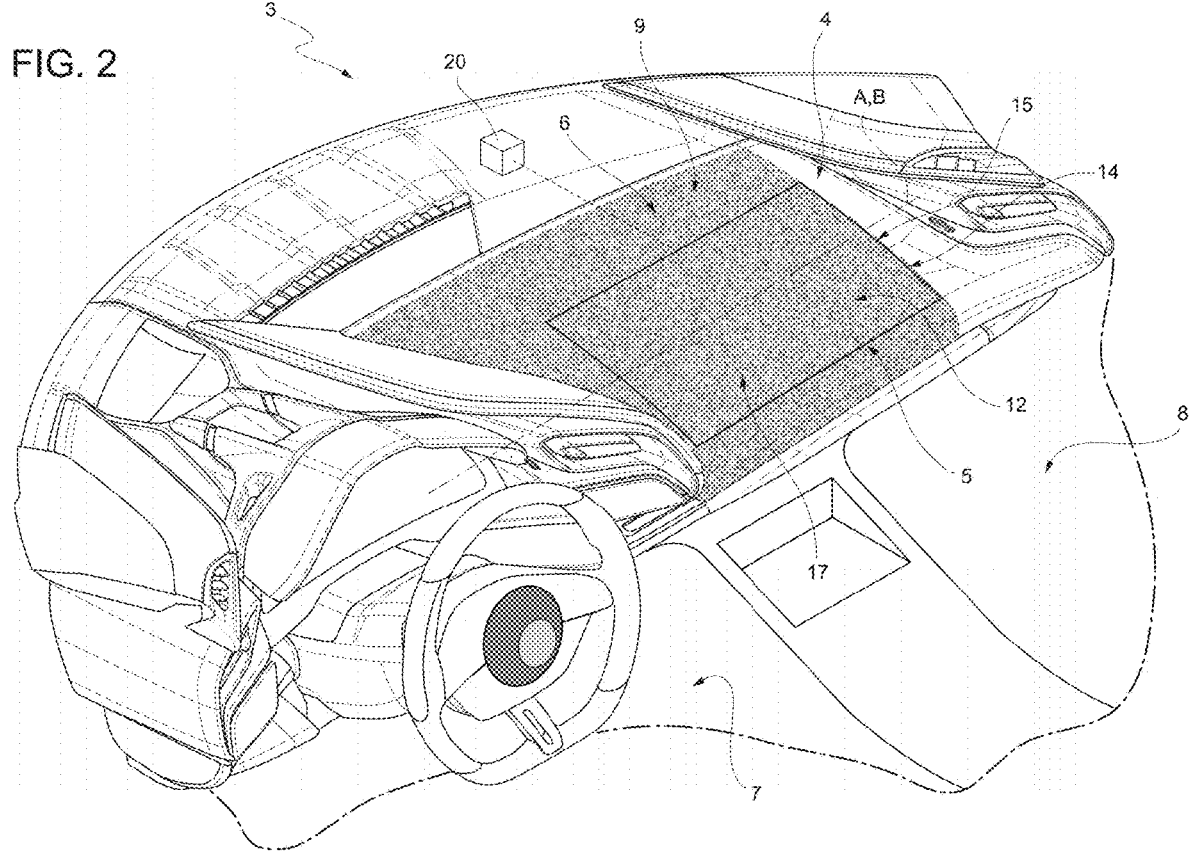
FIG. 2 is a perspective schematic view of part of the interior of the passenger compartment of the vehicle of FIG. 1 in which a central display device can be seen in a first embodiment in a first configuration.

In FIG. 1, the number 1 indicates overall a road vehicle provided with two front wheels 2 and two rear wheels 2 (in particular driving wheels). The vehicle 1 is provided with a passenger compartment 3 which is adapted to house at least one driver DR and preferably one or more passengers P, of which at least one alongside the driver DR as illustrated in FIG. 1.

The same reference numbers and letters in the figures identify the same elements or components with the same function.

In the context of the present description the term "second" component does not imply the presence of a "first" component. Said terms are employed as labels to improve clarity and should not be understood in a limitative manner.

The elements and the characteristics illustrated in the different preferred embodiments, including the drawings, can be combined with or isolated from one another without departing from the protective scope of the present application as described below.

Furthermore, the road vehicle 1 comprises a frame (of known type and therefore not illustrated in detail), and a vehicle dashboard 4 inside the passenger compartment and fixed to the frame. The vehicle dashboard 4 is arranged frontally to the driver DR and to any passenger P and/or, at least partially, between the driver DR and any passenger P.

As illustrated in the non-limiting embodiments of the attached figures, the road vehicle 1 comprises a content display device 5, which is arranged at the vehicle dashboard 4, in particular on a central portion 6 of the vehicle dashboard 4 between a driving position 7 and a passenger position 8.

In particular, the dashboard 4 comprises in turn an exposed surface 9, which can be seen from the inside of the passenger compartment 3, namely from the driving position 7 or from the passenger position 8. More in particular, the exposed surface 9 is substantially the aesthetic finish surface of the dashboard 4, namely the curved surface that delimits the top of the dashboard 4. For example, the exposed surface is made of leather, carbon fibre or other composite materials, wood, etc.

Advantageously but without limitation, the content display device 5 comprises a projection surface 10, which is arranged so as to substantially correspond to at least part of the exposed surface 9 and is configured to be visible to the passenger P and/or to the driver DR while driving. In particular, the projection surface 10 is the surface which the driver DR or the passenger P looks at to view the content thereof.

In the non-limiting embodiments of the attached figures the projection surface 10 is arranged at the central portion 6 of the dashboard 4.

In detail, the content display device 5 further comprises at least one projection device 11, which comprises the projection surface 10 and is configured to project one or more contents IM (driving-related and/or distracting) onto the projection surface 10.

Advantageously, the content display device 5 comprises at least one first aesthetic surface 12, also configured so as to substantially correspond to the above-mentioned part of the exposed surface 9. In other words, the aesthetic surface comprises an outer layer 13 provided with a finish, which preferably corresponds to the finish (for example carbon fibre, leather, wood, etc.) of the rest of the exposed surface 9.

Furthermore, the display device 5 comprises a support element 14, pivotably mounted on the vehicle dashboard 4 and on which, at contiguous faces (namely portions 14', 14" that define a lateral surface of the support element 14), around an axis A of symmetry of the flippable support element 14, at least the first projection surface 10 and the first aesthetic surface 12 are arranged.

Preferably, the display device 5 further comprises a movement system 15, which is configured to rotate of the support element 14 between a first configuration (illustrated in FIG. 2), in which the first aesthetic surface is contiguous to the rest of the exposed surface 9 and the first projection surface 10 is concealed inside the dashboard 4; and a second configuration (illustrated in FIG. 4, passing through the intermediate rotation phase illustrated in FIG. 3), in which the first projection surface 10 is contiguous to the rest of the exposed surface 9 and the first aesthetic surface 12 is concealed inside the dashboard 4.

Advantageously but without limitation, the first projection surface 10 has the same shape as the first aesthetic surface 12. In other words, rotating the support element 14 by 180° in the embodiment of FIGS. 2 to 5 and by 120° in the embodiment of FIG. 6, the exposed surface 9 remains the same, namely maintains the same shape, since the surfaces

10 and 12 have the same shape which, rotating, will occupy the same space, without interruption relative to the rest of the exposed surface 9 of the vehicle dashboard 4. In this way, the display device 5 is substantially integrated, thus improving the aesthetics and curved line of the passenger compartment 3. In detail, the surfaces 10 or 12 follow at least a curved line of the exposed surface 9, in particular, they correspond to the exposed surface.

Preferably but without limitation, the first projection device 11 is a first curved screen 16, mounted on board the support element 14, in particular on the portion 14'.

Figure 3:
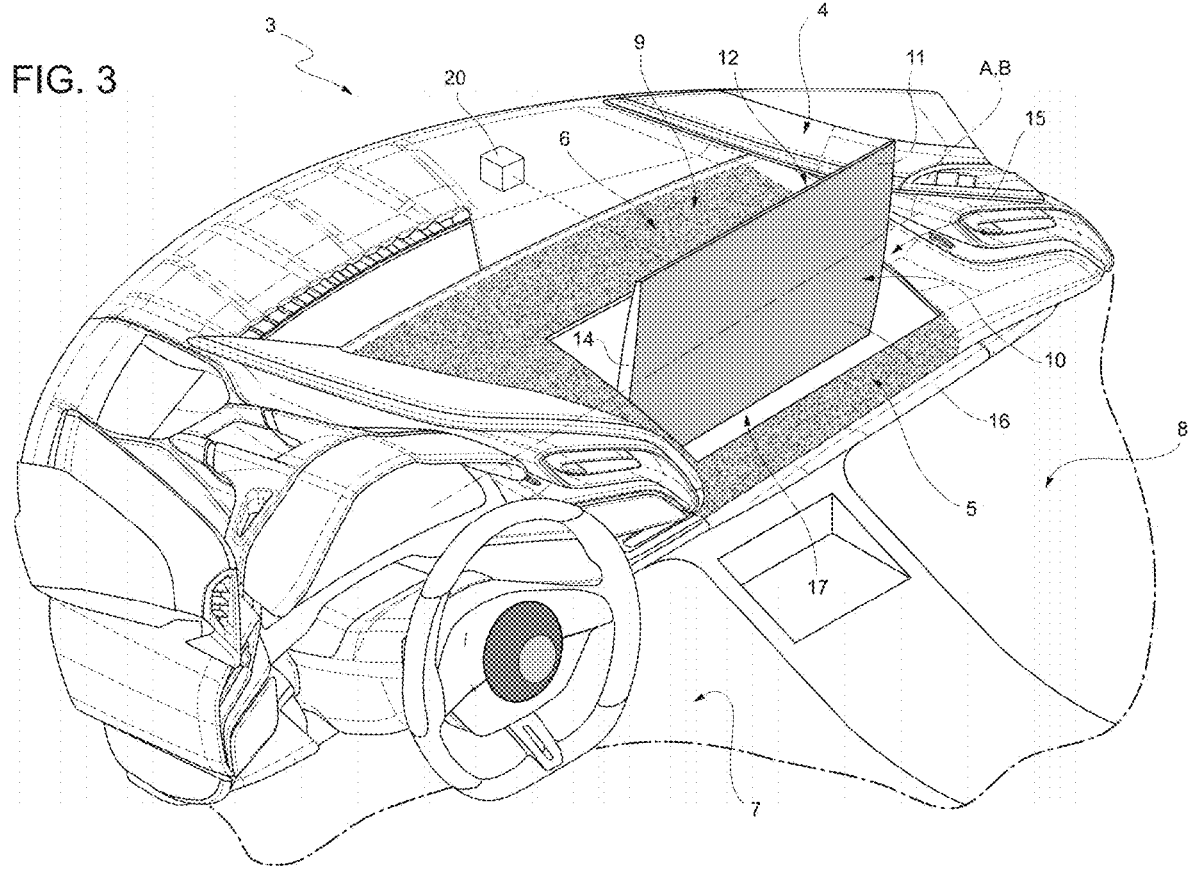
FIG. 3 is a perspective schematic view of part of the embodiment of FIG. 2 in an intermediate configuration.
Figure 4:
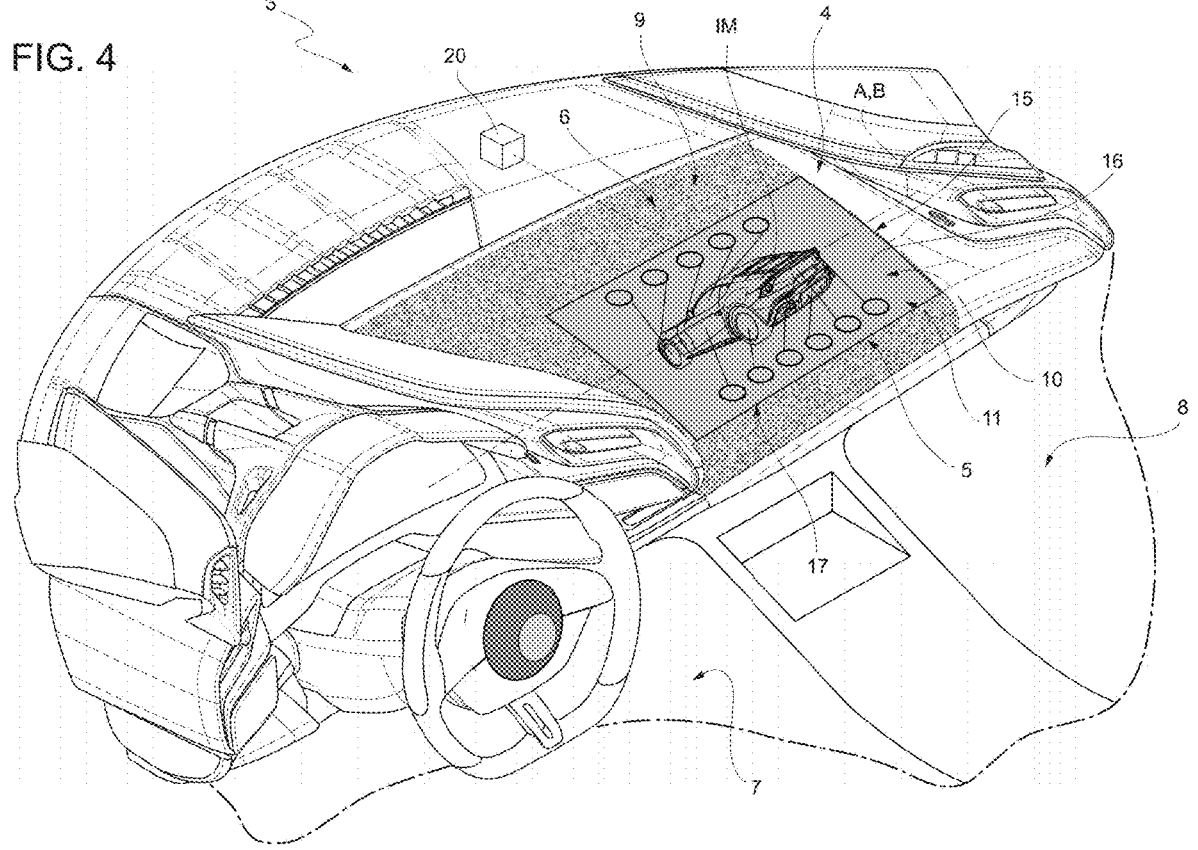
FIG. 4 is a perspective schematic view of part of the embodiment of FIG. 2 in a second configuration.
Figure 5:
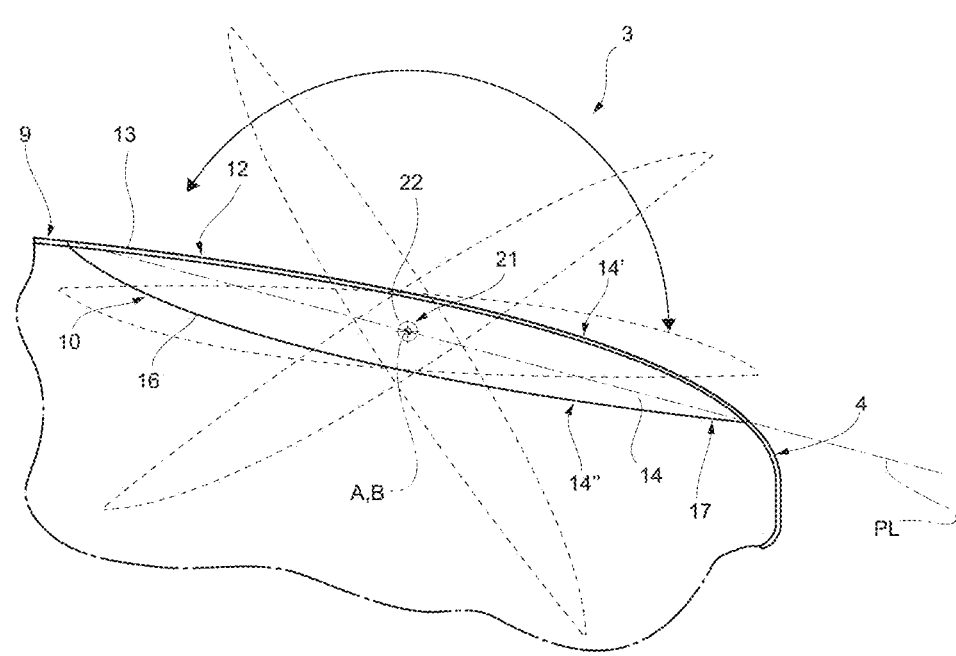
FIG. 5 is a cross section schematic view, with details removed for clarity, of part of the interior of the passenger compartment of the vehicle of FIG. 2 showing the section in various configurations of a display device.

The non-limiting embodiment of FIGS. 2 to 4 illustrates progressively the passage from the first configuration, in which the aesthetic surface 12 can be seen, to the second configuration, in which the projection surface 10 can be seen, namely the screen 16 from the interior of the passenger compartment 3.

In particular, in the non-limiting embodiments of FIGS. 2 to 5, the support element 14 is a double-sided drum 17, in which the first projection surface 10 and the first aesthetic surface 12 are opposed to each other with respect to a transverse plane of symmetry PL of the support element 14. In other words, the surfaces 10 and 12 define the lateral surface of the double-sided drum 17, which is divided into the two (sides) portions 14' and 14".

Figure 6:
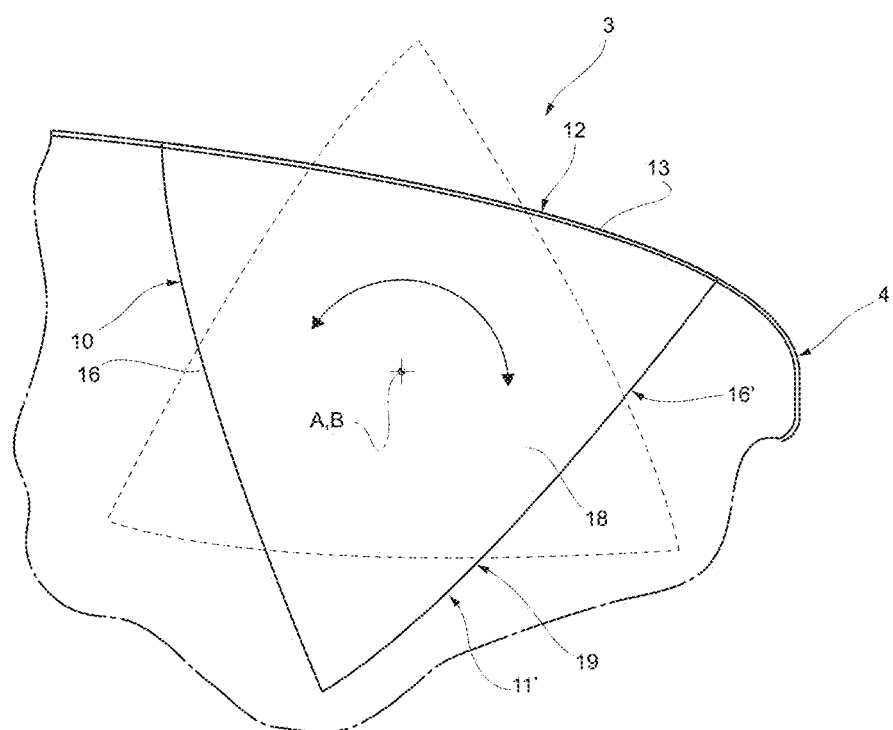
FIG. 6 is a cross section schematic view, with details removed for clarity, of part of the interior of the passenger compartment of a road vehicle showing the section in various configurations of a second embodiment of a display device.

Alternatively, in the non-limiting embodiment of FIG. 6, the support element 14 is a three-sided drum 18, in which the first projection surface 10, the first aesthetic surface 12 and a further surface 19 are equally arranged around a transverse rotation axis B of the support element 14. In other words, the drum 18 differs from the drum 17 due to the addition of a surface 19 which, together with the others 10 and 12, defines the lateral surface of the drum 18.

In particular, each "side" of the drums 17 and 18 has the same surface as the others that compose the lateral surface of said drum 17, 18.

Obviously it is also possible, with the same criterion, to use drums with a greater number of sides.

In some non-limiting cases, the drum 18 comprises a second projection device 11', which is configured to project one or more contents IM onto the further surface 19.

Preferably but without limitation, the second projection device 11' is a second curved screen 16', mounted on board the support element 14. In particular, the second curved screen 16' is of different type from the first curved screen 16. For example, the first curved screen 16 is a liquid crystal or LED screen, while the curved screen 16' is an e-ink screen. In this way, according to the conditions of light and reflection on the dashboard 4, the driver DR or the passenger P can opt for the screen with the best display. Alternatively or additionally, the two curved screens 16, 16' can show different contents, chosen for example by the driver.

Alternatively, without limitation, the further surface 19 is a second aesthetic surface, having an outer finish different from the first aesthetic surface 12. As previously mentioned in relation to the first aesthetic surface 12, also the further surface 19, in this case, can be made of carbon fibre, metal, glass, wood, plastic, resin, leather, fabric or any other finish.

Advantageously but without limitation, the road vehicle 1 further comprises a control unit 20 configured to selectively enable and disable the projection device 11, 11' in the second and in the first configuration respectively. In this way, it is possible to save energy and preserve the electronic components, since the screen 16, 16' is substantially switched off if it is in a position of the support element 14 not visible to the driver DR or to the passenger P, namely inside the dashboard 4.

According to some preferred but non-limiting embodiments, the vehicle 1 further comprises an actuator system 21 configured to move the support element 14 between the first configuration and the second configuration.

In some cases, the actuator system 21 is an electric motor. In other cases, the actuator system 21 is a spring mechanism.

Preferably but without limitation, the actuator system 21 is configured to move the support element 14 from the first configuration to the second configuration when the road vehicle 1 is switched on and, vice versa, when the road vehicle 1 is switched off.

Alternatively or additionally, the actuator system 21 can be operated by the driver DR and/or by the passenger P by means of an appropriate command.

In the non-limiting embodiments of the attached figures, the rotation axis B of the support element 14 is parallel to the transverse axis T of the road vehicle.

In other non-limiting embodiments not illustrated, the axis B of the support element 14 is parallel to the longitudinal axis L, namely to a normal direction of travel of the road vehicle.

In further non-limiting embodiments not illustrated, the dashboard 4 comprises a central tunnel, namely the structure between the driving position 7 and the passenger position 8 with longitudinal extension, along the axis L. In particular, in said embodiments the display system 5 is arranged at the upper surface of the central tunnel. More in particular, without limitation, the axis B of the support element 14 is parallel to the longitudinal axis L and therefore the support element 14 rotates around an axis parallel to the normal direction of travel of the road vehicle 1.

In use, while driving, the driver DR and the passenger P can easily view the projection surface 10. In particular, the projection device 11, 11' projects and varies the contents IM according to the vehicle conditions (for example speed, accelerations applied, torque delivered, etc.). In particular, when the road vehicle 1 is switched on, the support element 14 rotates around a pin 22 (substantially corresponding to the rotation axis B) to pass from the first configuration to the second configuration. In other words, with the vehicle switched off, or according to the preference of the driver DR or passenger P, the display device 5 can be concealed inside the dashboard, and its place is taken by the aesthetic surface 12, preferably having the same finish as the rest of the exposed surface 9 of the dashboard 4.

In the case of a three-sided drum 18, on the other hand, in use, the driver DR and the passenger P can vary the aesthetic surface as they prefer, passing for example from a carbon finish to a leather finish, to rest an object thereon and obtain greater adhesion.

Preferably, the display devices 5 described above are also used to provide the driver DR with suggestions for driving on the racing circuit, for example of the type described in the Italian application 102021000025037 by the same Applicant.

Although the invention described above makes particular reference to a precise embodiment example, it should not be considered limited to said embodiment example, since its scope includes all the variations, modifications or simplifications covered by the attached claims such as, for example, a different type of road vehicle (for example with front wheel drive), a different shape of the passenger compartment, a different type of projection surface or device, an extreme curvature of the exposed surface, etc.

The vehicle described above has numerous advantages.

Firstly, it reduces the visual impact for the driver, eliminating protruding screens.

Furthermore, it improves flexibility in the design of road vehicle interiors, since the dashboard and the shapes thereof are no longer constrained by the presence of a large flat rectangular screen in the central portion.

LIST OF REFERENCE NUMBERS OF THE FIGURES 1 vehicle
2 wheels
3 passenger compartment
4 dashboard
5 display device
6 central portion
7 driving position
8 passenger position
9 exposed surface
10 first projection surface
11 first projection device
12 first aesthetic surface
13 outer layer
14 support element
15 movement system
16 curved screen
17 two-sided drum
18 three-sided drum
19 further surface
20 control unit
21 actuator system
22 pin
11' second projection device
14' portion
14" portion
16' curved screen
A axis of symmetry
B axis
DR driver
IM contents
L axis
P passenger
PL plane
T axis

The invention claimed is:

1. A road vehicle (1) comprising:

four wheels (2), of which at least one pair of driving wheels (2);

a passenger compartment (3) configured to accommodate a driver (DR) and at least one passenger (P) alongside the driver (DR);

a vehicle dashboard (4), comprising in turn an exposed surface (9) visible from within the passenger compartment (3);

a content display device (5);

a first projection device (11), which is configured to project one or more contents (IM) onto a first projection surface (10); the first projection device (11) comprising the first projection surface (10), which is configured to substantially correspond with a part of the exposed surface (9), to be visible to the passenger (P) and/or driver (DR) while driving;

at least a first aesthetic surface (12), also configured to substantially correspond with said part of the exposed surface (9);

a support element (14) in the form of a drum, pivotably mounted to the vehicle dashboard (4) about an axis (A) of symmetry and on which at least the first projection surface (10) and the first aesthetic surface (12) are opposed to each other or are equally arranged about the axis (A);

a movement system (15) configured to rotate the support element (14) between:

a first configuration, wherein the first aesthetic surface (12) is contiguous with the rest of the exposed surface (9) and the first projection surface (10) is hidden within the dashboard (4), and a second configuration, wherein the first projection surface (10) is contiguous to the rest of the exposed surface (9) and the first aesthetic surface (12) is hidden within the dashboard (4), wherein the first projection surface (10) and the first aesthetic surface (12) have substantially the same shape and are configured such that, when the support element (14) is rotated between the first and second configurations, the exposed surface (9) of the dashboard (4) maintains continuity and aesthetic coherence with the first aesthetic surface (12) and the first projection surface (10), respectively.

2. The road vehicle (1) according to claim 1, wherein the first projection surface (10) has the same shape as the first aesthetic surface.

3. The road vehicle (1) according to claim 1, wherein the first projection device (11) is a first curved screen (12) mounted on board the support element (14).

4. The road vehicle (1) according to claim 1, wherein the support element (14) is a two-sided drum (17), wherein the first projection surface (10) and the first aesthetic surface (12) are opposed to each other with respect to a plane (PL) of transverse symmetry of the support element (14).

5. The road vehicle (1) according to claim 1, wherein the support element (14) is a three-sided drum (18), wherein the first projection surface (10), the first aesthetic surface (12) and a further surface (19) are equally arranged with respect to each other about an axis (B) of transverse rotation of the support element (14).

6. The road vehicle (1) according to claim 5, and comprising a second projection device (11'), which is configured to project one or more contents (IM) onto the further surface (19).

7. The road vehicle (1) according to claim 6, wherein the second projection device (11') is a second curved screen (16') mounted on board the support element (14).

8. The road vehicle (1) according to claim 7, wherein the second curved screen is of a different type from the first curved screen.

9. The road vehicle (1) according to claim 5, wherein the further surface (19) is a second aesthetic surface having an outer finish different from the first aesthetic surface (12).

10. The road vehicle (1) according to claim 1 and comprising a control unit (20) configured to selectively enable and disable the projection device (11, 11') in the second and first configurations respectively.

11. The road vehicle (1) according to claim 1 and comprising an actuator system (21) configured to move the support element (14) from the first configuration to the second configuration, in particular when switching on the road vehicle (1), and vice versa, in particular when switching off the road vehicle (1).

* * * * *